United States Patent
Atkinson

(10) Patent No.: US 7,281,149 B2
(45) Date of Patent: Oct. 9, 2007

(54) SYSTEMS AND METHODS FOR TRANSITIONING A CPU FROM IDLE TO ACTIVE

(75) Inventor: Lee W Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 430 days.

(21) Appl. No.: 10/785,775

(22) Filed: Feb. 24, 2004

(65) Prior Publication Data
US 2005/0188235 A1  Aug. 25, 2005

(51) Int. Cl.
*G06F 1/30* (2006.01)
(52) U.S. Cl. ............................ 713/323; 713/330
(58) Field of Classification Search ............... 713/322, 713/323
See application file for complete search history.

(56) References Cited

U.S. PATENT DOCUMENTS

| | | | | |
|---|---|---|---|---|
| 5,504,908 A * | 4/1996 | Ikeda | | 713/300 |
| 5,579,353 A * | 11/1996 | Parmenter et al. | | 375/376 |
| 5,692,201 A * | 11/1997 | Yato | | 713/322 |
| 5,760,636 A * | 6/1998 | Noble et al. | | 327/513 |
| 5,774,734 A | 6/1998 | Kikinis et al. | | |
| 5,903,746 A * | 5/1999 | Swoboda et al. | | 713/501 |
| 5,919,262 A | 7/1999 | Kikinis et al. | | |
| 5,926,394 A | 7/1999 | Nguyen et al. | | |
| 6,272,642 B2 * | 8/2001 | Pole et al. | | 713/300 |
| 6,459,175 B1 * | 10/2002 | Potega | | 307/149 |
| 6,608,528 B2 | 8/2003 | Tam et al. | | |
| 6,611,435 B2 | 8/2003 | Kumar et al. | | |
| 6,754,836 B2 * | 6/2004 | Shimizu et al. | | 713/320 |
| 6,766,460 B1 * | 7/2004 | Evoy et al. | | 713/323 |
| 6,829,713 B2 * | 12/2004 | Cooper et al. | | 713/320 |
| 6,920,571 B2 * | 7/2005 | Shaver et al. | | 713/310 |
| 2003/0237012 A1 * | 12/2003 | Jahagirdar et al. | | 713/500 |

OTHER PUBLICATIONS

World Wide Web, http://www.tomshardware.com/mobile/20021101/smartpc-04.html; "The Gigahertz Dupe: Dell SmartStep 205N," By: Harald Thon and Ull Ries, Nov. 1, 2002; 4pp.

World Wide Web, http://www.theregister.co.uk/content/2/17776.html; "Old Trick Aids Intel in 1GHz Notebook Spin." By: Mike Magee; Mar. 21, 2001; 5 pp.

* cited by examiner

*Primary Examiner*—Chun Cao

(57) ABSTRACT

A system for transitioning a CPU from idle to active comprises a sequencer operable to receive a stopclock signal and generate a controlled transitioning signal in response thereto, and a speed control device coupled to the sequencer and operable to controllably ramp up the operation of the CPU in response to the controlled transitioning signal.

7 Claims, 3 Drawing Sheets

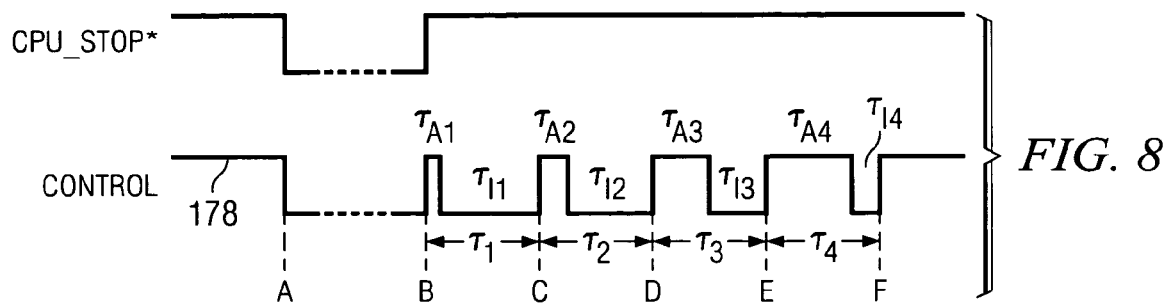
*FIG. 8*
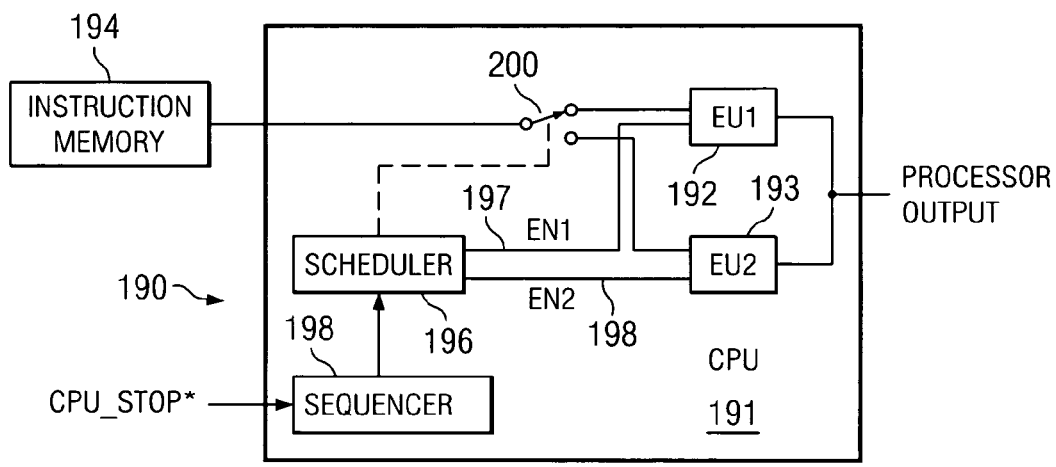
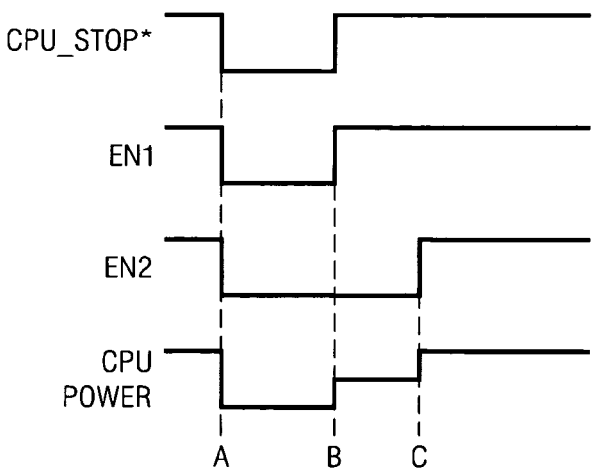

SYSTEMS AND METHODS FOR TRANSITIONING A CPU FROM IDLE TO ACTIVE

TECHNICAL FIELD OF THE INVENTION

The present invention relates generally to the field of computers and computing devices, and in particular to a system and method for transitioning a central processing unit (CPU) from idle to active mode.

BACKGROUND OF THE INVENTION

In order to reduce power consumption of computers and computing devices, central processing units (CPUs) typically enter into an idle state after a specified period of non-use from the users. Reduced power consumption is desirable because it minimizes operating cost, avoids overheating of the components, and, for battery-operated devices, increases time between charges and prolongs the operating life of the battery.

As CPUs have become faster and more powerful, their power requirements have also increased. In these systems, the sudden transition from an idle state to an active state causes an instantaneous current surge to the CPU, and has serious adverse effects on the CPU and its power supply. The result of an uncontrolled current surge, commonly called the load-step current, is system lockup and/or a failure of the power supply.

SUMMARY OF THE INVENTION

In accordance with an embodiment of the present invention, a system for transitioning a CPU from idle to active comprises a sequencer operable to receive a stopclock signal and generate a controlled transitioning signal in response thereto, and a speed control device coupled to the sequencer and operable to controllably ramp up the operation of the CPU in response to the controlled transitioning signal.

In accordance with another embodiment of the invention, a method of transitioning a CPU from idle to active comprises receiving a stopclock signal and generating a controlled transitioning signal in response to the stopclock signal, and controllably ramping up the operation of the CPU in response to the controlled transitioning signal.

BRIEF DESCRIPTION OF THE DRAWINGS

For a more complete understanding of the present invention, the objects and advantages thereof, reference is now made to the following descriptions taken in connection with the accompanying drawings in which:

FIG. 8 is an embodiment of a simplified timing diagram of the system for performing CPU soft-start shown in FIG. 7;

FIG. 9 is a simplified schematic diagram of an embodiment of a system for performing CPU soft-start according to the present invention; and FIG. 10 is an embodiment of a simplified timing diagram of the system for performing CPU soft-start shown in FIG. 9.

DETAILED DESCRIPTION OF THE DRAWINGS

The traditional remedy for addressing high surge currents is to add more local capacitance to prevent the CPU supply voltage from dipping below a minimum safe operating level when the CPU resumes from idle. However, the solution of adding or increasing local capacitance is costly and requires additional precious real estate. Further, because capacitors are inherently more unreliable than other components in a computer system, the addition of capacitors may increase the failure rate of these systems. Embodiments of the present invention provides for soft-starting a CPU from idle by introducing intermediate performance states by either manipulating its clock signal frequency, pulse-width modulating its clock enable, or sequencing the execution units of the CPU.

Figure 1:
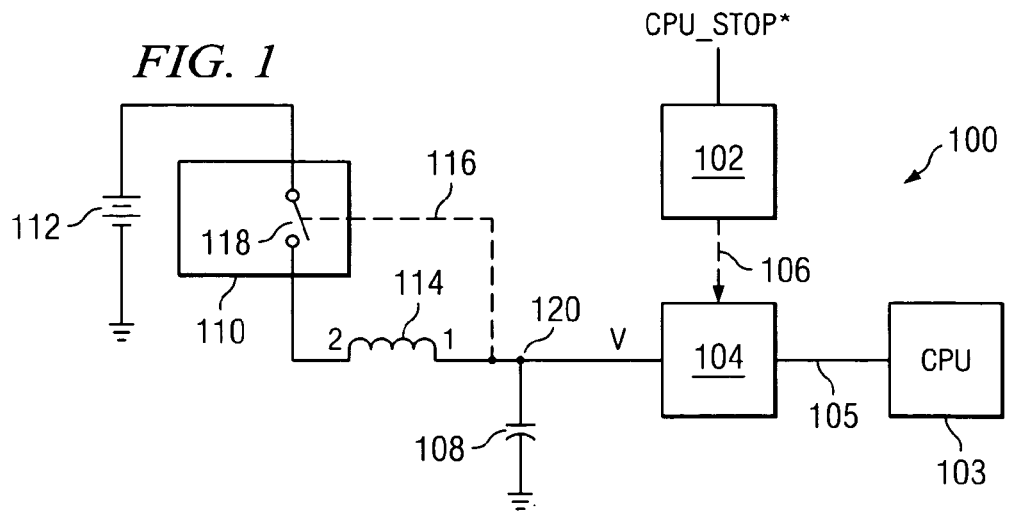
FIG. 1 is a simplified functional block diagram of an embodiment of a system for performing CPU soft-start according to the present invention.

FIG. 1 is a simplified functional block diagram of an embodiment of a system 100 for performing CPU soft-start according to the present invention. System 100 is shown in FIG. 1 in a conceptual manner for ease of understanding. System 100 comprises a sequencer 102 coupled to or in communication with a central processing unit (CPU) 103. The term "CPU" will be used herein to refer to an integrated circuit in general, and to a processor or computing circuit in particular. Sequencer 102 is coupled to a speed control device 104 that is either coupled to CPU 103 or is part of CPU 103. Sequencer 102 receives a signal, CPU_STOP*, which is a "stopclock" signal used in the microprocessor industry to signal a transition between idle and active states. According to embodiment of the present invention, Sequencer 102 generates a control signal or voltage 106 that is provided to speed control device 104. The output of speed control device 104 is a controlled transition signal 105 fed to CPU 103. Controlled transition signal 105 may be a supply voltage, a clock signal, or an enable signal that is used to slowly transition CPU 103 from idle to active.

In the functional block diagram shown in FIG. 1, speed control device 104 outputs a supply voltage, V. Speed control device 104 is also shown coupled to a local capacitor 108 and receives a supply voltage from a DC/DC power supply 110. The supply voltage is present at a node 120 between local capacitor 108 and an inductor 114 coupled to the output of DC/DC power supply 110. A feedback loop 116 is coupled to node 120 and is used to control a switch 118 in DC/DC power supply 110 used to couple the power output of a battery 112 or another direct current source to inductor 114.

In operation during the CPU active state, DC/DC power supply 110 conducts DC source voltage from battery 112 through inductive element 114 to create the CPU supply voltage. CPU 103 transitions from an active state to an idle state due to the assertion of the stopclock signal from a high to a low logic level at point A in the timing diagram in FIG. 2. The stopclock signal is used to disconnect the clock source from the core of the CPU, which effectively removes the CPU load from power supply 110. In response, the CPU power supply voltage at node 120 experiences a spike, causing switch 118 to open to disconnect battery 112 from power supply 110. The current seen at node 120 drops to zero or a minimal value. CPU 103 thus enters the idle state.

Figure 2:
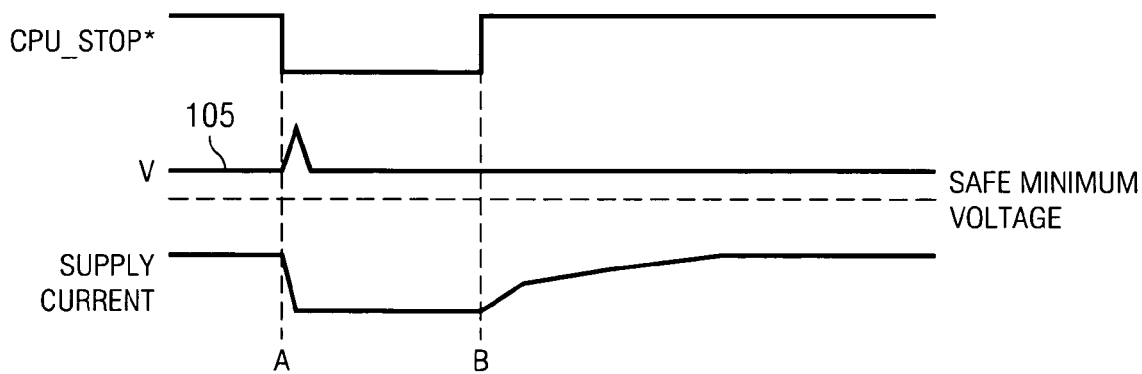
FIG. 2 is an embodiment of a simplified timing diagram of the system for performing CPU soft-start shown in FIG. 1.

At time B indicated in the timing diagram in FIG. 2, the stopclock signal is de-asserted or returned to a high logic level. The de-assertion of the stopclock signal indicates a desire to resume active operations from the idle state. Upon receipt of the stopclock signal, sequencer 102 instructs speed control device 104 to generate a controlled transition signal that slowly ramps up the CPU operations, such as demonstrated in the supply current shown in the timing diagram, in response to the controlled transition signal. Thus, instead of an instantaneous current surge at resume, CPU 103 experiences a gradual and smooth transition from idle to the active state. The spike in supply current and the problems associated therewith are therefore eliminated.

Figure 3:
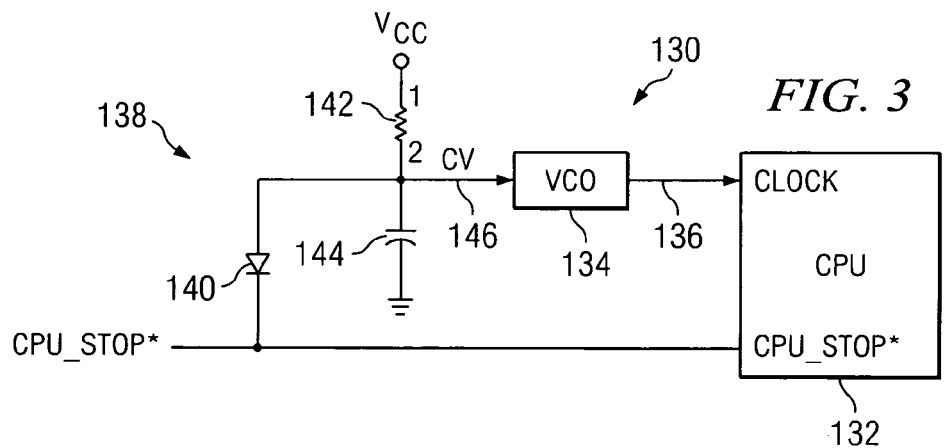
FIG. 3 is a simplified schematic diagram of an embodiment of a system for performing CPU soft-start according to the present invention.

FIG. 3 is a simplified schematic diagram of an embodiment of a system 130 for performing CPU soft-start according to the present invention. A CPU 132 receives a controlled transitional clock signal 136 generated by a speed control device such as a voltage-controlled oscillator 134. A sequencer circuit 138 receives a stopclock (CPU_STOP*) signal and responds to its changing states by generating a control voltage 146 for controlling voltage-controlled oscillator 134. Sequencer circuit 138 comprises a diode 140 with its cathode coupled to the stopclock signal and its anode coupled to a common point between a resistor 142 and a capacitor 144 coupled in series between the supply voltage, $V_{CC}$, and ground.

Figure 4:
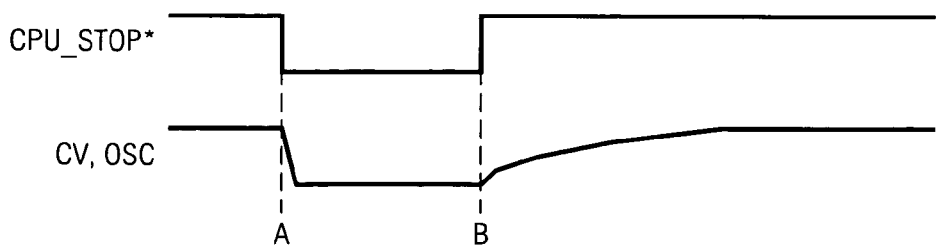
FIG. 4 is an embodiment of a simplified timing diagram of the system for performing CPU soft-start shown in FIG. 3.

In operation, at time A in the timing diagram in FIG. 4, the stopclock signal is asserted low and control voltage 146 provided to voltage-controlled oscillator 134 follows the stopclock signal. Diode 140 enables a rapid discharge of capacitor 144 when CPU_STOP* is asserted. This causes voltage-controlled oscillator 134 to output a low clock signal 136 to CPU 132 and puts CPU 132 in the idle mode. When the stopclock signal is released at time B, control voltage 146 gradually rises according to the resistance-capacitance (R-C) time constant of resistor 142 and capacitor 144. Although CPU resumes execution immediately upon the stopclock signal being returned to a high logic level, the CPU speed gradually increases. The supply current needed for the CPU to resume operation at the slower frequencies can be as little as ¼ of the maximum operating current level. Therefore, the performance and the current consumption of CPU 132 are increased in a manner where the DC/DC power supply (not shown in FIG. 3) can maintain regulation without a current surge. It should be noted that sequencer circuit 138 is but one exemplary circuit embodiment that may be used to generate a slow ramp-up signal to control voltage-controlled oscillator 134, and that other circuits or devices may be used.

Figure 5:
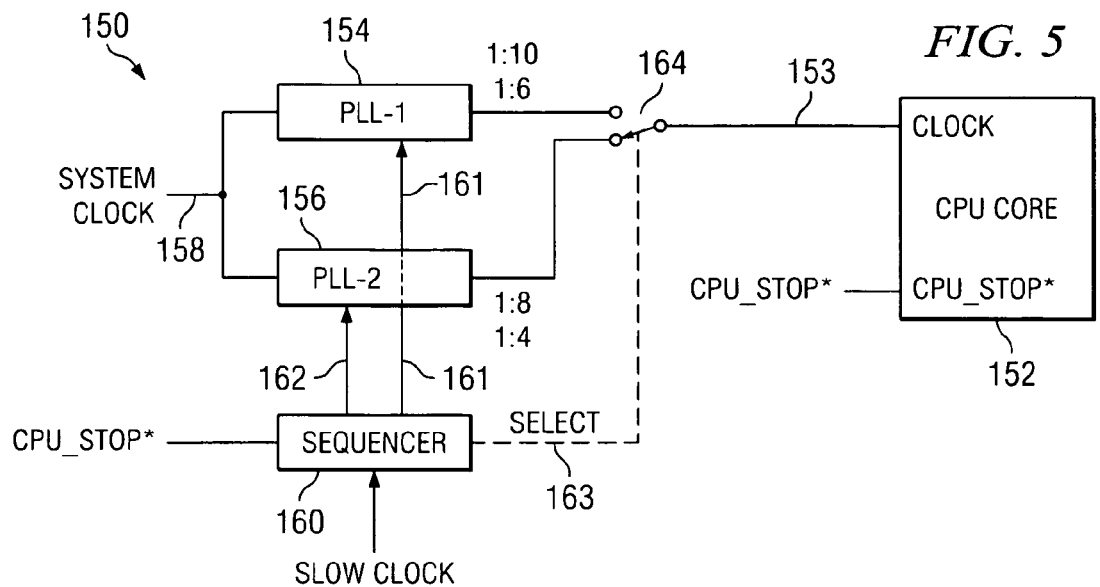
FIG. 5 is a simplified schematic diagram of an embodiment of a system for performing CPU soft-start according to the present invention.

FIG. 5 is a simplified schematic diagram of another embodiment of a system 150 for performing CPU soft-start according to the present invention. In system 150, the clock frequency ramping is limited to the CPU clock while keeping the system clock signals constant. System 150 is coupled to a CPU core 152 where the majority of the CPU functions is performed. System 150 generates a controlled clock signal 153 that slowly increases its frequency when the CPU resumes from idle. System 150 comprises a first phase-locked loop (PLL-1) 154 and a second phase-locked loop (PLL-2) 156, both receive control signals 161 and 162, respectively, generated by a sequencer 160. In the exemplary embodiment shown, phase-locked loop 154 is operable to output a clock frequency of either six times or ten times the system clock frequency, and phase-locked loop 156 is operable to output a clock frequency of either four times or eight times the system clock frequency. Other circuits or devices capable of similarly generating a periodic signal as a multiple of a base signal can also be used. Sequencer 160 also generates a select signal 163 that is used to direct switch 164 to couple one of the outputs from phased-lock loops 154 and 156 to the clock input of CPU core 152. Sequencer 160 receives the stopclock signal as well as a slow clock signal as input. A system clock signal 158 is the input clock signal to phased-lock loops 154 and 156, and the CPU, when in the active state, operates at a speed that is an integer-multiple of the system clock.

Figure 6:
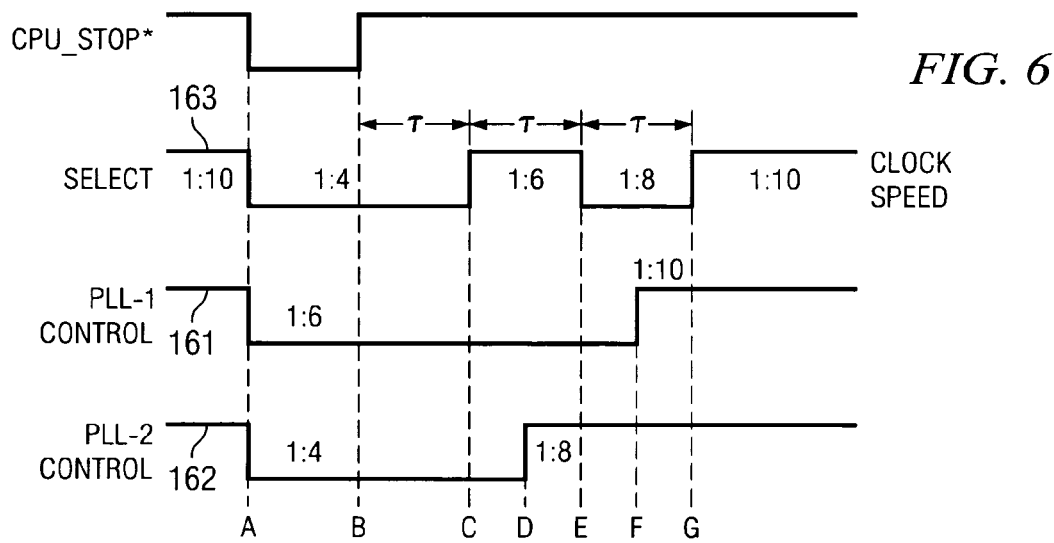
FIG. 6 is an embodiment of a simplified timing diagram of the system for performing CPU soft-start shown in FIG. 5.

During the transitioning period from idle to active operating modes, the CPU is provided with a clock signal that steps up in frequency. This is accomplished by alternately coupling and disconnecting phase-locked loop 154 and phase-locked loop 156 to the CPU core. With reference to the timing diagram in FIG. 6, prior to time A, the CPU is operating in active state at its full clock speed. For example, CPU core 152 may be operating at 1 GHz with a system clock speed of 100 MHz. Phase-locked loop 154 is operable to multiply the system clock by ten to generate the 1 GHz CPU core clock signal. At time A, the stopclock signal is asserted to bring the CPU to an idle state. Sequencer 160 also receives the asserted stopclock signal and in response generates control signals 161 and 162 to reset phase-locked loops 154 and 156 to their respective lowest frequency. For example, the lowest frequency of phase-locked loop 156 is the system clock frequency multiplied by four (400 MHz), and the lowest frequency of phase-locked loop 154 is the system clock frequency multiplied by six (600 MHz). Further, the select signal 163 generated by sequencer 160 selects the output of phase-locked loop 156 so that CPU core 152 operates at the lowest possible clock rate.

At time B, the stopclock or CPU_STOP* signal is de-asserted. Sequencer 160, in response to the change in the stopclock signal, outputs select signal 163 that couples the output from phase-locked loop 154 to CPU core 152 after a predetermined time, T, has elapsed since the de-assertion of the stopclock signal. The time period, T, may be determined by the slow clock signal received by sequencer 160 and may be approximately ten microseconds, for example. Therefore at time C, CPU core 152 is switched to operate at 600 MHz, or the lowest frequency generated by phase-locked loop 154. At time D, sequencer 160 generates a control signal 162 to instruct phase-locked loop 156 to step up its frequency to eight times the system clock, for example, 800 MHz. At time E, approximately time T after time C, sequencer 160 generates a select signal 163 that couples the output from phase-locked loop 156 to clock input 153 of CPU core 152. Therefore, CPU core 152 operates at 800 MHz. At time F, sequencer 160 generates a control signal 161 to instruct phase-locked loop 154 to step up its frequency to its next level—ten times the system clock, for example, 1 GHz. At time G, approximately time T after time E, sequencer 160 generates a select signal 163 that couples the output from phase-locked loop 154 to clock input 153 of CPU core 152. Therefore after time G, CPU core 152 operates at its full speed of 1 GHz, which is ten times the system clock speed.

At this time, the unused phase-locked loop 156 may be put into an idle or low power mode to conserve energy consumption.

Constructed and operating in this manner, CPU core 152 clock frequency is increased incrementally over a period of time by switching between two leap-frogging phase-locked loops that alternately step up the clock frequency. By using two alternating phase-locked loops, the switching of the CPU from one clock to the next is essentially instantaneous, and the CPU operation is continuous and uninterrupted. Further, by using two alternating phase-locked loop devices, each is given time to stabilize after its frequency is ramped up before the CPU core is switched to its new higher frequency. It should be understood that the number of phase-locked loop, the frequency transitions, and the timing thereof are provided above as examples and may be optimized for particular CPUs and computer systems as desired.

Figure 7:
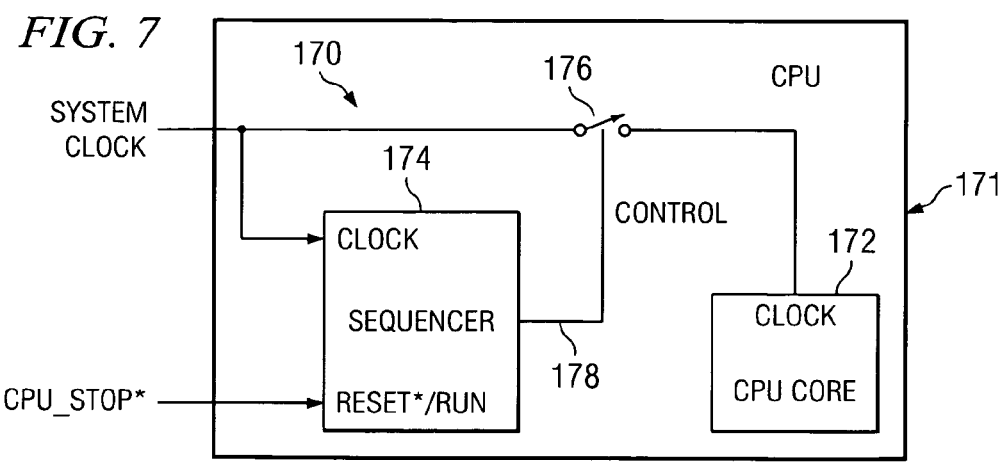
FIG. 7 is a simplified schematic diagram of an embodiment of a system for performing CPU soft-start according to the present invention.

FIG. 7 is a simplified schematic diagram of yet another embodiment of a system 170 for performing CPU soft-start according to the present invention. System 170 resides within a CPU 171 that comprises a CPU core 172. System 10 comprises a sequencer 174 operable to generate a control signal 178 for enabling and disabling a clock enable circuit 176 in response to the CPU_STOP* stopclock signal. Sequencer 174 may comprise a four-stage counter, for example, operating synchronously with the system clock. Clock enable circuit 176 is implemented in the embodiment as a switch that is operable to couple or disconnect a system clock signal to CPU core 172 in response to the control signal. FIG. 7 illustrates an exemplary embodiment of system 170; other implementations are contemplated by the invention.

With reference also to FIG. 8, showing a timing diagram of the operations of system 170, when the stopclock signal is asserted at time A, sequencer 174 is reset and generates a control signal 178 that opens switch 176 to disconnect the system clock from CPU core 172. CPU core 172 and thus CPU 171 enter the idle state in response to the system clock being disconnected therefrom. When the stopclock is de-asserted at time B, CPU resumes full operation over a plurality of time frames, $T_N$. At time B, sequencer 174 generates a control signal 178 to couple the system clock to CPU core 172 so that it begins to operate in accordance with the system clock. Sequencer 174 also begins to count up to a first predetermined value and then generates control signal 178 to disconnect the system clock from CPU core 172. For example, the system clock may be coupled to CPU core 172 for a first active time period, $T_{A1}$, before it is disconnected by sequencer 174. After a first idle time period $T_{I1}$, where $T_{A1}+T_{I1}=T_1$, and at time C, sequencer 174 re-connects the system clock to CPU core 172 for a second predetermined active time period, $T_{A2}$, where $T_{A2}$ is greater than $T_{A1}$. Thereafter, sequencer 174 disconnects the system clock from CPU core 172 for a second idle time period, $T_{I2}$, where $T_{A2}+T_{I2}=T_2$, so that CPU 171 idles during the second time period. At time D, sequencer 174 instructs switch 176 to couple the system clock to CPU core 172, and counts for a third time period, $T_{A3}$, before disconnecting the system clock, where $T_{A3}>T_{A2}>T_{A1}$. After the count of sequencer 174 reaches a value that corresponds to $T_{A3}$, sequencer 174 opens switch 176 to disconnect the CPU core from the system clock. CPU 171 enters a third idle period, $T_{I3}$, where $T_{A3}+T_{I3}=T_3$ and $T_{I1}>T_{I2}>T_{I3}$. At the expiration of $T_3$ (time E), sequencer 174 again reconnects CPU core 172 to the system clock for a time period of $T_{A4}$, where $T_{A4}>T_{A3}>T_{A2}>T_{A1}$. After $T_{A4}$, sequencer 174 disconnects CPU core 172 from the system clock for a period of $T_{I4}$, where $T_{A4}+T_{I4}=T_4$ and $T_{I1}>T_{I2}>T_{I3}>T_{I4}$. At time F, sequencer 174 continually couples CPU core 172 to the system clock and CPU 171 operates at 100% of full power.

Preferably in the above example, $T_1=T_2=T_3=T_4$ and the period of active operation increases over $T_1$, $T_2$, $T_3$ and $T_4$ until the system clock is continually enabled to CPU core 172 by sequencer 174. As an example, $T_1=T_2=T_3=T_4=1$ microsecond, and the respective active time periods may comprise 20%, 40%, 60% and 80% of each time frame until 100% is reached. Averaged over each one microsecond time frame, the power consumed by the processor increases to full power over five microseconds. As a result, the power supply sees only 20% of the surge current if the CPU resumes to full power immediately.

FIG. 9 is a simplified schematic diagram of an embodiment of a system 190 for performing CPU soft-start according to the present invention. System 190 may be part of a CPU 191 or be external thereto. CPU 191 comprises at least two execution units 192 and 193 that are operable to execute instructions in parallel. An instruction memory 194 stores a plurality of instructions for execution by execution units 192 and 193 in CPU 191. System 190 comprises a scheduler 196 operable to generate an enable signal, EN1 197 and EN2 198 to execution units 192 and 193, respectively, in response to input from a sequencer 200. The enable signals are operable to selectively enable execution units 192 and 193 to receive instructions from instruction memory 194 and execute them. Scheduler 196 generates the enable signals 197 and 198 in response to the CPU_STOP* stopclock signal received by sequencer 200. The stopclock signal is indicative of CPU transition between idle and active states.

While also referencing the timing diagram shown in FIG. 10, the CPU_STOP* stopclock signal is asserted at time A, which also causes sequencer 200 to instruct scheduler 196 to disable both execution units 192 and 193. At this time, no instructions are fetched from instruction memory 194 and CPU 191 enters an idle mode. It may be seen that CPU power consumption falls to a minimal level. At time B, the stopclock signal is de-asserted. In response to the stopclock being de-asserted, sequencer 200 instructs scheduler 196 to enable one of the execution units, execution unit 192, for example. Execution unit 192 begins to execution instructions fetched from instruction memory 194 while execution unit 193 remains idle or disabled. CPU power consumption incrementally increases in response to execution unit 192 becoming active. After a predetermined time from the de-assertion of stopclock or at time C, scheduler 196 sends an enable signal to the remaining execution unit 193 so that it may also begin to execute instructions fetched from instruction memory 194. CPU power consumption is elevated again in response to both execution units being active.

As a result of bringing the execution units online one-by-one when resuming from idle, the power surge is lessened to a tolerable level and is further staggered over time. Further, although FIG. 9 illustrates a system with two execution units, this invention is applicable to CPUs with more than two execution units by successively enabling each execution unit all of them are active. Alternatively, scheduler 196 may enable a subset of execution units incrementally until all are active. For example, for a CPU having nine execution units operating in parallel, scheduler 196 may enable two or three execution units each time, with a time delay between each enable, until all execution units are active. Operating in this manner, the power surge commonly associated with resumption from idle to active is staggered and in smaller increments.

It may be seen that embodiments of the present invention responds to a de-assertion of the stopclock signal by slowly ramping up the operation of the CPU. In particular embodiment, the present invention provide for soft-starting a CPU from idle by introducing intermediate performance states by either manipulating its clock signal frequency, pulse-width modulating its clock enable, or sequencing the execution units of the CPU.

What is claimed is:

1. A system for transitioning a CPU from idle to active, comprising:
   a sequencer operable to receive a stopclock signal and generate a controlled transitioning signal in response thereto; and
   a speed control device coupled to the sequencer and operable to controllably ramp up operation of the CPU in response to the controlled transitioning signal, wherein the speed control device comprises:
   at least two clock circuits coupled to the sequencer, each clock circuit operable to generate a plurality of clock signals in response to the controlled transitioning signal;
   the sequencer further operable to generate a selection signal to alternately select the between the clock circuits to successively couple the respective clock signals to the CPU, where the clock signals have increasing frequencies.

2. The system, as set forth in claim 1, wherein the clock signals are increasing multiples of a system clock signal.

3. The system, as set forth in claim 1, wherein the first and second clock circuits comprise first and second phase-locked loop circuits.

4. A system for transitioning a CPU from idle to active, comprising:
   a sequencer operable to receive a stopclock signal and generate a controlled transitioning signal in response thereto; and
   a speed control device coupled to the sequencer and operable to controllably ramp up operation of the CPU in response to the controlled transitioning signal, wherein the speed control device comprises a clock enable circuit operable to alternately couple and disconnect a clock signal to the CPU in response to the controlled transitioning signal over a transition period, the clock enable circuit operable to gradually increase the time the clock signal is coupled to the CPU and gradually decrease the time the clock signal is disconnected from the CPU over the transition period.

5. A system for transitioning a CPU from idle to active, comprising:
   a sequencer operable to receive a stopclock signal and generate a controlled transitioning signal in response thereto; and
   a speed control device coupled to the sequencer and operable to controllably ramp up operation of the CPU in response to the controlled transitioning signal, wherein the CPU comprises a plurality of execution units, and the speed control device comprises a scheduler coupled to the sequencer and operable to successively enable subsets of the plurality of execution units until all execution units are enabled in response to the controlled transitioning signal.

6. A method of transitioning a CPU from idle to active, comprising:
   receiving a stopclock signal and generating a controlled transitioning signal in response to the stopclock signal; and
   controllably ramping up the operation of the CPU in response to the controlled transitioning signal, wherein controllably ramping up the operation of the CPU comprises alternately coupling and disconnecting a clock signal to the CPU in response to the controlled transitioning signal over a transition period, and gradually increasing the time the clock signal is coupled to the CPU and gradually decreasing the time the clock signal is disconnected from the CPU over the transition period.

7. A method of transitioning a CPU from idle to active, comprising:
   receiving a stopclock signal and generating a controlled transitioning signal in response to the stopclock signal; and
   controllably ramping up the operation of the CPU in response to the controlled transitioning signal, wherein controllably ramping up the operation of the CPU comprises successively enabling subsets of a plurality of execution units of the CPU until all execution units are enabled in response to the controlled transitioning signal.

* * * * *